(12) United States Patent
Edenfeld

(10) Patent No.: US 9,228,568 B2
(45) Date of Patent: Jan. 5, 2016

(54) METHODS FOR SCHEDULING THE REPLACEMENT OF WIND TURBINE BATTERIES AND RELATED SYSTEMS

(71) Applicant: General Electric Company, Schenectady, NY (US)

(72) Inventor: Thomas Edenfeld, Osnabrück (DE)

(73) Assignee: General Electric Company, Schenectady, NY (US)

( * ) Notice: Subject to any disclaimer, the term of this patent is extended or adjusted under 35 U.S.C. 154(b) by 492 days.

(21) Appl. No.: 13/786,707

(22) Filed: Mar. 6, 2013

(65) Prior Publication Data

US 2014/0257751 A1    Sep. 11, 2014

(51) Int. Cl.
*G06F 19/00*    (2011.01)
*F03D 11/00*    (2006.01)
*F03D 1/00*    (2006.01)

(52) U.S. Cl.
CPC ............ *F03D 11/0091* (2013.01); *F03D 1/003* (2013.01); *F05B 2260/42* (2013.01); *F05B 2260/80* (2013.01); *F05B 2270/325* (2013.01)

(58) Field of Classification Search
CPC ......... F21K 9/00; G01N 5/0205; G01N 15/10
USPC .................................................. 702/183, 185
See application file for complete search history.

(56) References Cited

U.S. PATENT DOCUMENTS

| | | | |
|---|---|---|---|
| 8,922,066 B2 * | 12/2014 | Kesler | ........................... 307/104 |
| 2009/0037145 A1 | 2/2009 | Suzuki et al. | |
| 2012/0316814 A1 * | 12/2012 | Rahaman | ........... G01R 31/3679 702/63 |

* cited by examiner

*Primary Examiner* — Edward Raymond
(74) *Attorney, Agent, or Firm* — Dority & Manning, P.A.

(57) ABSTRACT

A method for scheduling the replacement of wind turbine batteries is disclosed. The method may include monitoring an air temperature of a location at which a battery is stored within a wind turbine, determining with a controller a predicted lifetime for the battery based on the air temperature and determining when to replace the battery based at least in part on the predicted lifetime.

20 Claims, 4 Drawing Sheets

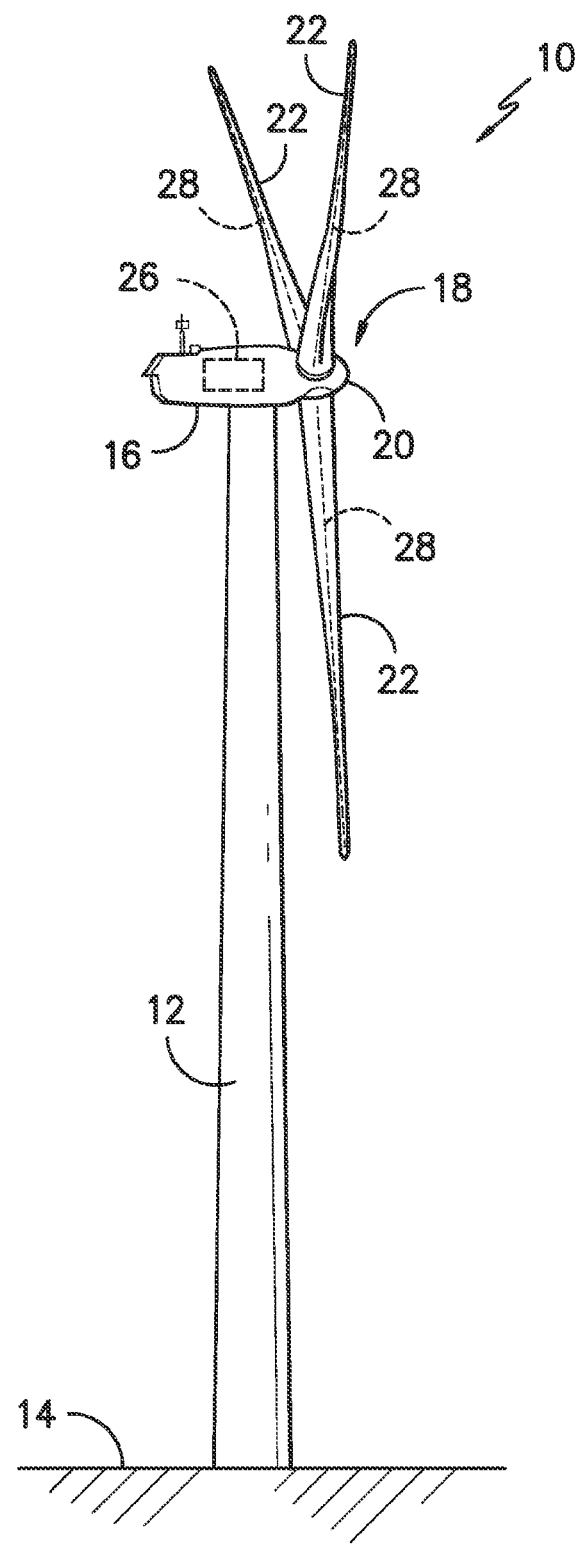
FIG. -1-

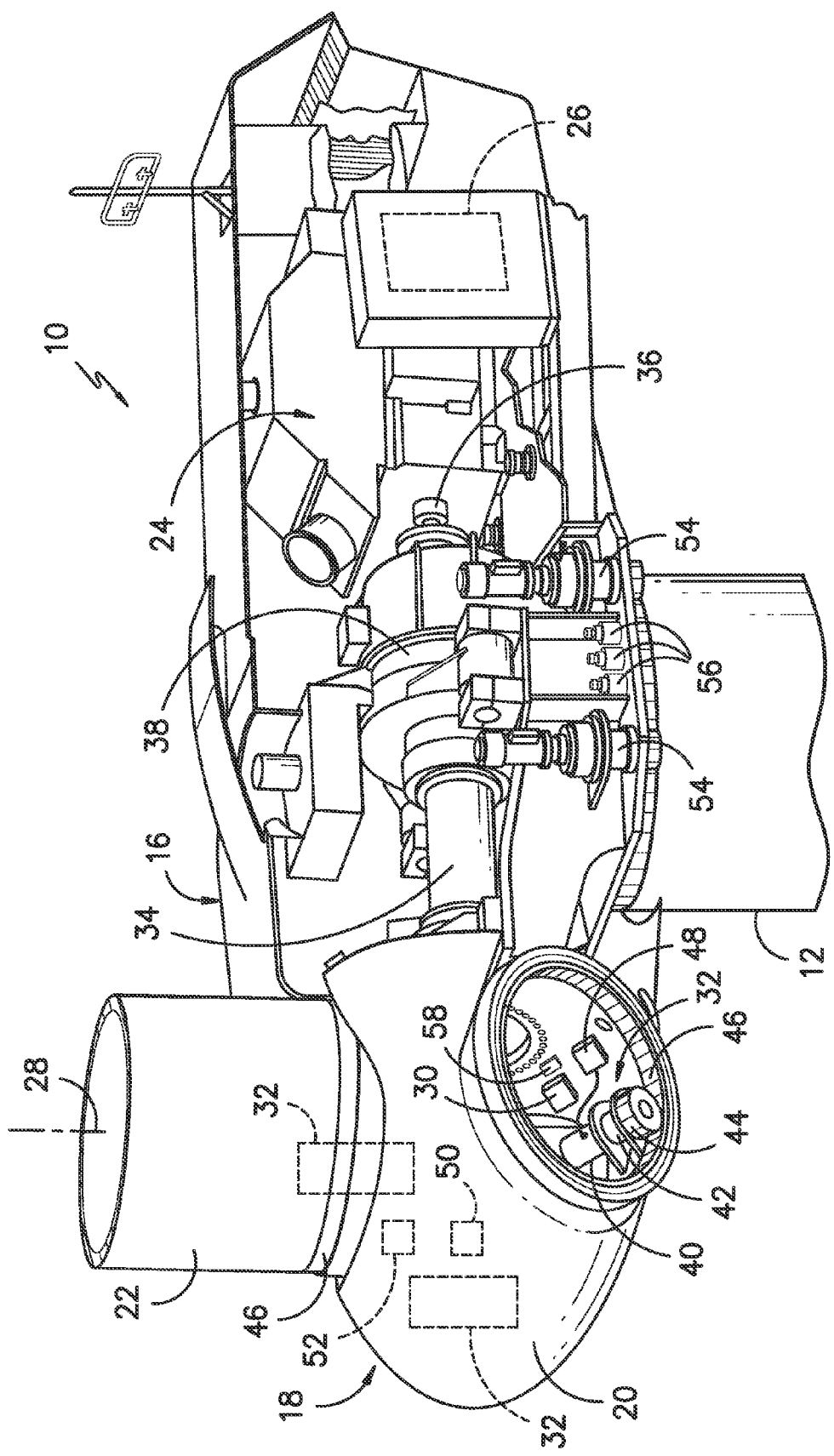
FIG. -2-

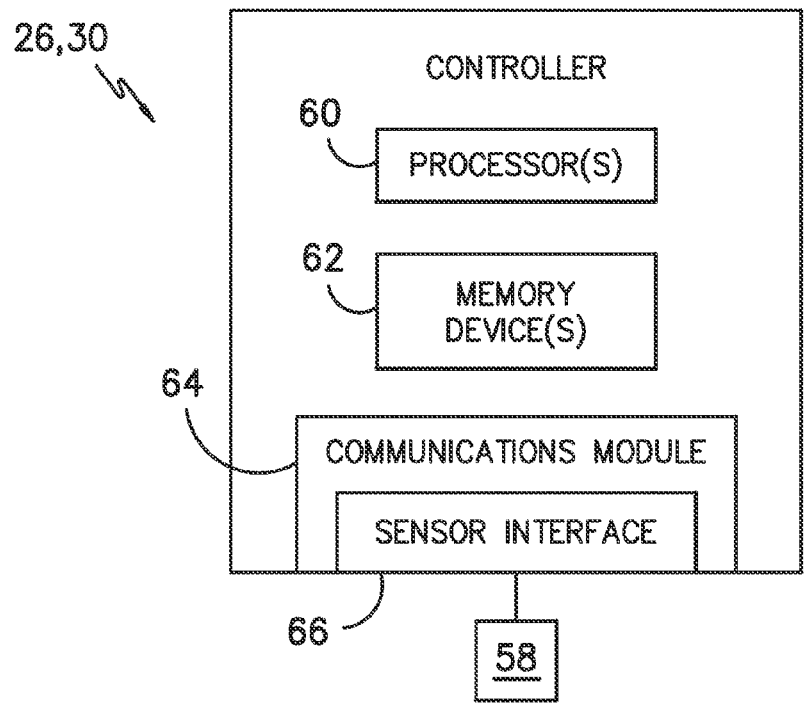
FIG. -3-
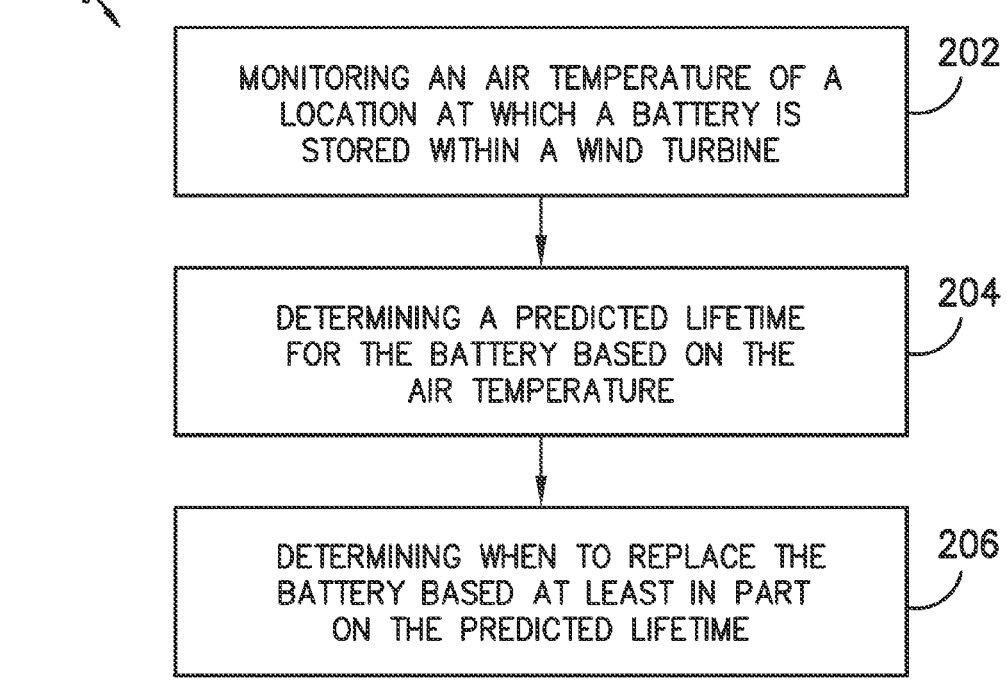
FIG. -4-

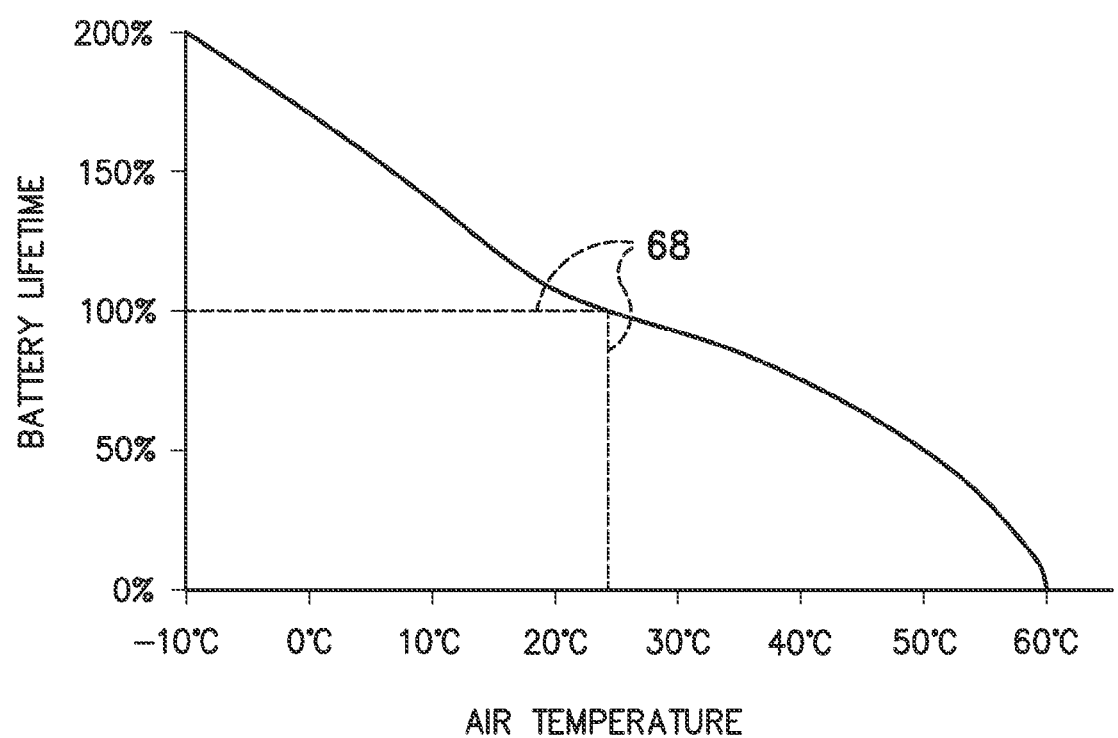
FIG. -5-

METHODS FOR SCHEDULING THE REPLACEMENT OF WIND TURBINE BATTERIES AND RELATED SYSTEMS

FIELD OF THE INVENTION

The present subject matter relates generally to wind turbines and, more particularly, to methods for scheduling the replacement of wind turbine batteries and related systems.

BACKGROUND OF THE INVENTION

Generally, a wind turbine includes a tower, a nacelle mounted on the tower, and a rotor coupled to the nacelle. The rotor typically includes a rotatable hub and a plurality of rotor blades coupled to and extending outwardly from the hub. Each rotor blade may be spaced about the hub so as to facilitate rotating the rotor to enable kinetic energy to be transferred from the wind into usable mechanical energy, and subsequently, electrical energy.

Various batteries are often used within a wind turbine to supply electrical power to wind turbine components. For example, one or more pitch batteries are often stored within the hub so as to supply power to the pitch adjustment mechanisms used to pitch the rotor blades. As with all batteries, the pitch batteries have a limited lifetime across which they may supply power. Thus, the pitch batteries must be periodically replaced to avoid pitch system failures.

Current replacement strategies employ a fixed replacement schedule in which the pitch batteries are replaced at a predetermined interval, such as every three years. This predetermined interval typically corresponds to a time period beyond which it is believed that each battery's lifetime will extend regardless of the operating conditions of the wind turbine. Accordingly, such battery replacement strategies fail to take into account the variations in battery lifetimes that exist due to changing operating conditions, particularly changes in the ambient air temperature. As a result, batteries are often removed too early, thereby increasing both the operating costs and the downtime of a wind turbine over an extended period of time.

Accordingly, improved methods or strategies for scheduling the replacement of wind turbine batteries would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present subject matter is directed to a method for scheduling the replacement of wind turbine batteries. The method may include monitoring an air temperature of a location at which a battery is stored within a wind turbine, determining with a controller a predicted lifetime for the battery based on the air temperature and determining whether to replace the battery based at least in part on the predicted lifetime.

In another aspect, the present subject matter is directed to a system for predicting the remaining lifetime of wind turbine batteries. The system may generally include a battery configured to supply power to a component of the wind turbine and a temperature sensor configured to measure an air temperature of a location at which the battery is stored within the wind turbine. In addition, the system may include a controller communicatively coupled to the temperature sensor. The controller may be configured to determine a predicted lifetime for the battery based on the air temperature measurements provided by the temperature sensor.

In a further aspect, the present subject matter is directed to a wind turbine including a tower, a nacelle mounted on the tower and a rotor coupled to the nacelle. The rotor may include a hub and at least one rotor blade extending from the hub. The wind turbine may also include a pitch adjustment mechanism configured to pitch the blade and a pitch battery configured to supply power to the pitch adjustment mechanism. In addition, the wind turbine may include a temperature sensor configured to measure an air temperature within the hub and a controller communicatively coupled to the temperature sensor. The controller may be configured to determine a predicted lifetime for the pitch battery based on the air temperature measurements provided by the temperature sensor.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 illustrates a perspective view of one embodiment of a wind turbine;

FIG. 2 illustrates a simplified, internal view of one embodiment of a nacelle of a wind turbine;

FIG. 3 illustrates a schematic diagram of one embodiment of suitable components that may be included within a controller of a wind turbine;

FIG. 4 illustrates a flow diagram of one embodiment of a method for scheduling the replacement of wind turbine batteries in accordance with aspects of the present subject matter; and FIG. 5 illustrates a graphical representation of one example of a mathematical relationship that may be stored within a controller of a wind turbine to allow the controller to predict the remaining lifetime of a wind turbine battery as a function of ambient air temperature.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to systems and methods for predicting the remaining lifetime of batteries used within a wind turbine and/or for scheduling the replacement of such batteries. In several embodiments, a temperature sensor may be utilized to measure the temperature of the ambient air surrounding the location at which one or more batteries are stored within a wind turbine. For example, temperature sensors may be disposed within the hub so as to monitor the temperature of the air surrounding the pitch batteries used to supply power to the pitch adjustment mechanisms of the wind turbine. The temperature measurements provided by the sensors may be transmitted to a controller to allow such controller to predict a remaining lifetime for the batteries. This predicted lifetime may then be utilized to determine when the batteries need to be replaced.

Referring now to the drawings, FIG. 1 illustrates a perspective view of one embodiment of a wind turbine 10. As shown, the wind turbine 10 generally includes a tower 12 extending from a support surface 14, a nacelle 16 mounted on the tower 12, and a rotor 18 coupled to the nacelle 16. The rotor 18 includes a rotatable hub 20 and at least one rotor blade 22 coupled to and extending outwardly from the hub 20. For example, in the illustrated embodiment, the rotor 18 includes three rotor blades 22. However, in an alternative embodiment, the rotor 18 may include more or less than three rotor blades 22. Each rotor blade 22 may be spaced about the hub 20 to facilitate rotating the rotor 18 to enable kinetic energy to be transferred from the wind into usable mechanical energy, and subsequently, electrical energy. For instance, the hub 20 may be rotatably coupled to an electric generator 24 (FIG. 2) positioned within the nacelle 16 to permit electrical energy to be produced.

The wind turbine 10 may also include a turbine control system or turbine controller 26 centralized within the nacelle 16. In general, the turbine controller 26 may comprise a computer or other suitable processing unit. Thus, in several embodiments, the turbine controller 26 may include suitable computer-readable instructions that, when implemented, configure the controller 26 to perform various different functions, such as receiving, transmitting and/or executing wind turbine control signals. As such, the turbine controller 26 may generally be configured to control the various operating modes (e.g., start-up or shut-down sequences) and/or components of the wind turbine 10. For example, the controller 26 may be configured to adjust the blade pitch or pitch angle of each rotor blade 22 (i.e., an angle that determines a perspective of the blade 22 with respect to the direction of the wind) about its pitch axis 28 in order to control the rotational speed of the rotor blade 22 and/or the power output generated by the wind turbine 10. For instance, the turbine controller 26 may control the pitch angle of the rotor blades 22, either individually or simultaneously, by transmitting suitable control signals directly or indirectly (e.g., via a pitch controller 30 (FIG. 2)) to one or more pitch adjustment mechanisms 32 (FIG. 2) of the wind turbine 10. During operation of the wind turbine 10, the controller 26 may generally control each pitch adjust mechanism 32 in order to alter the pitch angle of each rotor blade 22 between 0 degrees (i.e., a power position of the rotor blade 22) and 90 degrees (i.e., a feathered position of the rotor blade 22).

Referring now to FIG. 2, a simplified, internal view of one embodiment of the nacelle 16 of the wind turbine 10 shown in FIG. 1 is illustrated. As shown, a generator 24 may be disposed within the nacelle 16. In general, the generator 24 may be coupled to the rotor 18 for producing electrical power from the rotational energy generated by the rotor 18. For example, as shown in the illustrated embodiment, the rotor 18 may include a rotor shaft 34 coupled to the hub 20 for rotation therewith. The rotor shaft 34 may, in turn, be rotatably coupled to a generator shaft 36 of the generator 24 through a gearbox 38. As is generally understood, the rotor shaft 34 may provide a low speed, high torque input to the gearbox 38 in response to rotation of the rotor blades 22 and the hub 20. The gearbox 38 may then be configured to convert the low speed, high torque input to a high speed, low torque output to drive the generator shaft 36 and, thus, the generator 24.

Additionally, the turbine controller 26 may also be located within the nacelle 16. As is generally understood, the turbine controller 26 may be communicatively coupled to any number of the components of the wind turbine 10 in order to control the operation of such components. For example, as indicated above, the turbine controller 26 may be communicatively coupled to each pitch adjustment mechanism 22 of the wind turbine 10 (one for each rotor blade 22) via a pitch controller 30 to facilitate rotation of each rotor blade 22 about its pitch axis 28.

In general, each pitch adjustment mechanism 32 may include any suitable components and may have any suitable configuration that allows the pitch adjustment mechanism 32 to function as described herein. For example, in several embodiments, each pitch adjustment mechanism 32 may include a pitch drive motor 40 (e.g., any suitable electric motor), a pitch drive gearbox 42, and a pitch drive pinion 44. In such embodiments, the pitch drive motor 40 may be coupled to the pitch drive gearbox 42 so that the pitch drive motor 40 imparts mechanical force to the pitch drive gearbox 42. Similarly, the pitch drive gearbox 42 may be coupled to the pitch drive pinion 44 for rotation therewith. The pitch drive pinion 44 may, in turn, be in rotational engagement with a pitch bearing 46 coupled between the hub 20 and a corresponding rotor blade 22 such that rotation of the pitch drive pinion 44 causes rotation of the pitch bearing 46. Thus, in such embodiments, rotation of the pitch drive motor 40 drives the pitch drive gearbox 42 and the pitch drive pinion 44, thereby rotating the pitch bearing 46 and the rotor blade 22 about the pitch axis 28.

In alternative embodiments, it should be appreciated that each pitch adjustment mechanism 32 may have any other suitable configuration that facilitates rotation of a rotor blade 22 about its pitch axis 28. For instance, pitch adjustment mechanisms 32 are known that include a hydraulic or pneumatic driven device (e.g., a hydraulic or pneumatic cylinder) configured to transmit rotational energy to the pitch bearing 46, thereby causing the rotor blade 22 to rotate about its pitch axis 28. Thus, in several embodiments, instead of the electric pitch drive motor 40 described above, each pitch adjustment mechanism 32 may include a hydraulic or pneumatic driven device that utilizes fluid pressure to apply torque to the pitch bearing 46.

In addition, the wind turbine 10 may also include one or more batteries for supplying power to one or more electrically powered components of the wind turbine 10. For example, the wind turbine 10 may include one or more pitch batteries 48, 50, 52 for supplying power to the pitch adjustment mechanisms 32 (e.g., to the pitch drive motor 40 of each mechanism 32) and/or to the pitch controller 30. Specifically, as shown in the illustrated embodiment, the wind turbine 10 includes a first pitch battery 48, a second pitch battery 50 and a third pitch battery 52 for supplying power to each of the three pitch adjustment mechanisms 32. However, in other embodiments, the wind turbine 10 may include any other number of pitch batteries 48, 50, 52. For instance, the wind turbine 10 may include a separate pitch battery to supply power to the pitch controller 30.

As shown in FIG. 2, the pitch batteries 48, 50, 52 may be stored within the hub 20, such as at a location adjacent to each respective pitch adjustment mechanism 32 and/or the pitch controller 30, and may be electrically coupled to each pitch adjustment mechanism 32 and/or the pitch controller 30 using a suitable power cable (not shown). However, in other embodiments, the pitch batteries 48, 50, 52 may be stored at any other suitable location on and/or within the wind turbine 10 (e.g., within the nacelle 16).

It should be appreciated that, in addition to the pitch batteries 48, 50, 52, the wind turbine 10 may also include various other batteries. For example, the wind turbine 10 may include one or more batteries for supplying power to one or more components housed within the nacelle 14, such as the turbine controller 26 or a yaw drive 54 of the wind turbine 10 or a brake assembly 56 of the wind turbine 10.

It should also be appreciated that the batteries described herein may be used as the primary power source for their associated wind turbine component(s) or as a back-up power source for such wind turbine component(s). For example, in one embodiment, the pitch batteries 48, 50, 52 may be configured to supply power to the pitch adjustment mechanisms 32 and/or to the pitch controller 30 in the event of a grid loss.

Referring still to FIG. 2, the wind turbine 10 may also include one or more sensors 58 for monitoring the ambient air temperature around and/or within the wind turbine 10. As will be described below, in accordance with aspects of the present subject matter, the temperature sensor(s) 58 may be configured to monitor the air temperature of the location(s) at which the battery(ies) of the wind turbine 10 are stored. For example, as shown in FIG. 2, a temperature sensor 58 may be disposed within the hub 20 to monitor the ambient air temperature within the hub 20, thereby allowing the temperature of the air surrounding the pitch batteries 48, 50, 52 to be measured. The measurements provided by the temperature sensor(s) 58 may then be transmitted to the pitch controller 30 and/or the turbine controller 26 for subsequent analysis.

It should be appreciated that the temperature sensors 58 may generally comprise any suitable sensors and/or other sensing devices known in the art for providing temperature measurements. For example, suitable temperature sensors may include, but are not limited to, thermocouples, thermometers, thermistors, resistance temperature detectors, fiber optic temperature sensors, semiconductor temperature sensors, pyrometers, thermal imagers and/or the like. Additionally, it should be appreciated that, although a single temperature sensor 58 is shown in FIG. 2, the wind turbine 10 may include any number of temperature sensors 58. For instance, in one embodiment, a separate temperature sensor 58 may be disposed within the hub 20 adjacent to each pitch battery 48, 50, 52.

It should also be appreciated that the wind turbine 10 may also include various other sensors for monitoring any other suitable parameters and/or conditions of the wind turbine 10. For example, the wind turbine 10 may include sensors for monitoring the pitch angle of each rotor blade 22, any bending moments on the rotor blades 22, the speed of the rotor 18 and/or the rotor shaft 32, the speed of the generator 24 and/or the generator shaft 34, the torque on the rotor shaft 32 and/or the generator shaft 34, the wind speed and/or wind direction and/or any other suitable parameters and/or conditions.

Referring now to FIG. 3, there is illustrated a block diagram of one embodiment of suitable components that may be included within the turbine controller 26 (or the pitch controller 30) in accordance with aspects of the present subject matter. As shown, the controller 26, 30 may include one or more processor(s) 60 and associated memory device(s) 62 configured to perform a variety of computer-implemented functions (e.g., performing the methods, steps, calculations and the like disclosed herein). As used herein, the term "processor" refers not only to integrated circuits referred to in the art as being included in a computer, but also refers to a controller, a microcontroller, a microcomputer, a programmable logic controller (PLC), an application specific integrated circuit, and other programmable circuits. Additionally, the memory device(s) 62 may generally comprise memory element(s) including, but not limited to, computer readable medium (e.g., random access memory (RAM)), computer readable non-volatile medium (e.g., a flash memory), a floppy disk, a compact disc-read only memory (CD-ROM), a magneto-optical disk (MOD), a digital versatile disc (DVD) and/or other suitable memory elements. Such memory device(s) 62 may generally be configured to store suitable computer-readable instructions that, when implemented by the processor(s) 60, configure the controller 26, 30 to perform various functions including, but not limited to, transmitting suitable control signals to one or more of the pitch adjustment mechanisms 32, determining predicted battery lifetimes for the wind turbine batteries based on ambient air temperature measurements and various other suitable computer-implemented functions.

Additionally, the controller 26, 30 may also include a communications module 64 to facilitate communications between the controller 26, 30 and the various components of the wind turbine 10. For instance, the communications module 64 may serve as an interface to permit the turbine controller 26, 30 to transmit control signals to each pitch adjustment mechanism 22 for controlling the pitch angle of the rotor blades 22. Moreover, the communications module 64 may include a sensor interface 66 (e.g., one or more analog-to-digital converters) to permit signals transmitted from the temperature sensor(s) 58 to be converted into signals that can be understood and processed by the processors 60.

It should be appreciated that the temperature sensor(s) 58 may be communicatively coupled to the communications module 64 using any suitable means. For example, as shown in FIG. 3, the sensor 58 is coupled to the sensor interface 66 via a wired connection. However, in other embodiments, the sensor 58 may be coupled to the sensor interface 66 via a wireless connection, such as by using any suitable wireless communications protocol known in the art.

Referring now to FIG. 4, a flow diagram of one embodiment of a method 200 for scheduling the replacement of wind turbine batteries is illustrated in accordance with aspects of the present subject matter. As shown, the method 200 may include monitoring an air temperature of a location at which a battery is stored within a wind turbine 202, determining a predicted lifetime for the battery based on the air temperature 204 and determining when to replace the battery based at least in part on the predicted lifetime 206.

In general, the disclosed method 200 may be utilized to optimize the amount of time that batteries are used within a wind turbine 10 while reducing wind turbine downtime. Specifically, by monitoring the ambient air temperature around the batteries (e.g., pitch batteries 48, 50, 52), the expected lifetime for each battery may be predicted. Thereafter, the batteries can be scheduled to be replaced at an appropriate time prior to the expiration of the predicted lifetime. Accordingly, unlike conventional scheduling methodologies that simply require that a battery be replaced after a predetermined amount of time (e.g., every three years), replacement scheduling may be more closely tied to the actual operating conditions existing for each wind turbine 10, thereby preventing batteries from being replaced too early for wind turbines operating in cooler or colder environments while preventing component malfunctions due dead batteries for wind turbines 10 operating in warmer or hotter environments.

As indicated above, at 202, the air temperature of the location at which a battery is stored within a wind turbine 10 may be initially monitored. For example, referring back to FIG. 2, to monitor the temperature of the air surrounding the pitch batteries 48, 50, 52, one or more temperature sensors 58 may be disposed within the hub 20. The temperature measurements provided by the sensor(s) 58 may then be transmitted to the pitch controller 30 and/or the turbine controller 26 for subsequent analysis and/or processing.

At 204, the pitch controller 30 and/or the turbine controller 26 may be configured to determine a predicted lifetime for one or more of the wind turbine batteries based on the air temperature measurements. For example, in several embodiments, a suitable algorithm may be stored within the controller(s) 26, 30 that provides a means for predicting the remaining battery lifetime of a given wind turbine battery. In such embodiments, the air temperature measurements provided by the sensors 58 may be used as inputs into the algorithm.

It should be appreciated that the algorithm may generally correspond to any suitable transfer function, mathematical relationship, map, look-up table and/or the like that allows for the remaining battery lifetime to be predicted based on the ambient air temperature measurements. For instance, FIG. 5 illustrates a graphical representation of one example of a mathematical function that relates battery lifetime to air temperature. As shown, the battery lifetime generally decreases as the air temperature increases.

Using the algorithm, the controller(s) 26, 30 may be configured to continuously update the predicted battery lifetime based on the temperature measurements provided by the sensor(s) 58. Specifically, in several embodiments, each wind turbine battery may have an established baseline lifetime at a given operating temperature, which may be provided by the battery manufacturer or may be established via testing. For example, as shown in FIG. 5, the battery associated with the illustrated data has a baseline lifetime (indicated by the dashed lines 68) at a given reference temperature (e.g., 25° C.). In such an embodiment, the controller(s) 26, 30 may be configured to update the predicted lifetime for a given battery by modifying the baseline lifetime based on each temperature measurement provided by the sensor(s) 58 or based on an average of the temperature measurements provided by the sensor(s) 58 (e.g., based on an average hourly, daily, weekly or monthly temperature). Thus, in the illustrated embodiment, if the temperature measurement(s) indicates that the ambient temperature within the hub 20 is above 25° C., the controller(s) 26, 30 may be configured to update the predicted lifetime by subtracting a specific amount of time from the baseline lifetime (with the amount of time being calculated as a function of both the difference between the measured temperature and the reference temperature and the amount of time at which the air temperature was at such measured temperature). For instance, if the baseline lifetime corresponds to 8 years and the battery being monitored has been exposed to an ambient air temperature of 35° C. for 20 days, the algorithm may subtract a calculated amount of time from the initial 8 year lifetime (e.g., 50 days—thereby leaving a remaining, predicted lifetime of 7 years and 315 days). Similarly, in the illustrated embodiment, if the temperature measurement(s) indicates that the ambient temperature within the hub is below 25° C., the controller(s) 26, 30 may be configured to update the predicted lifetime by adding a specific amount of time to the baseline lifetime (with the amount of time being calculated as a function of both the difference between the measured temperature and the reference temperature and the amount of time at which the air temperature was at such measured temperature).

It should be appreciated that, in other embodiments, the baseline lifetime may be associated with any other suitable reference temperature. For example, in another embodiment, the reference temperature may correspond to a minimum operating temperature for the subject batteries (e.g., −10° C. in the example shown in FIG. 5). In such an embodiment, the baseline lifetime may correspond to the maximum potential lifetime for the subject batteries. As such, the predicted lifetime may be determined by subtracting specific amounts of time from the baseline lifetime based on the temperature measurements provided by the sensor(s) 58 (assuming, of course, that each temperature measurement is above the minimum operating temperature).

Referring back to FIG. 4, at 206, a determination is made based at least in part on the predicted lifetime as to when to replace one or more of the wind turbine batteries. In general, such a determination may be made using any suitable methodology that utilizes the predicted lifetime as a factor in deciding when to replace a wind turbine battery. For example, in embodiments in which the wind turbine batteries are scheduled to be replaced on a predetermined date (e.g., when the batteries are on a fixed replacement schedule, such as every 3 years), the predicted lifetime may be utilized to determine whether to deviate from such fixed schedule. For example, each time the predicted lifetime of a battery is updated, the predicted lifetime may be compared to a minimum lifetime threshold associated with the battery. In such an embodiment, if the predicted lifetime has already fallen below the minimum lifetime threshold prior to the predetermined date or if it is anticipated that the predicted lifetime will fall below the minimum lifetime threshold prior to the predetermined date, an earlier replacement date may be set for the battery to ensure that the battery is replaced prior to going dead. However, if the predicted lifetime will not fall below the minimum lifetime threshold prior to the predetermined replacement date, the battery may simply be replaced as scheduled on the predetermined date.

It should be appreciated that the minimum lifetime threshold may generally correspond to any suitable threshold that may be set as a trigger point for modifying a fixed replacement schedule of a wind turbine battery. For example, in several embodiments, the minimum lifetime threshold may be defined as a function of the baseline lifetime for a battery, such as by defining the minimum lifetime threshold as a time period ranging from about 5% to about 25% of the baseline lifetime, such as from about 5% to about 15% of the baseline lifetime or from about 8% to about 12% of the baseline lifetime and any other subranges therebetween.

In another embodiment, a battery test may be performed on one or more of the wind turbine batteries and the predicted lifetime(s) may be used in connection with the test results to determine when to replace such battery(ies). For example, battery tests are often performed on the pitch batteries 48, 50, 52 by using the pitch adjustment mechanisms 32 to pitch the rotor blades 22 through a range of pitch angles (e.g., from 0° to 90°) and by subsequently analyzing the pitch rate of the blades 22. If each blade 22 is pitched at a normal pitch rate during the battery test, then it may be determined that the pitch batteries 48, 50, 52 are operating normally and that each has sufficient battery lifetime remaining. However, if one of the blades 22 is pitched slower than the normal pitch rate during the battery test, it may be determined that the battery capacity of the pitch battery 48, 50, 52 supplying power to the pitch adjustment mechanism 32 pitching such blade 22 may be low and it may be time to replace the battery 48, 50, 52. Similarly, if a blade 22 is not pitched at all during the battery test, it may be determined that the associated pitch battery 48, 50, 42 is dead or otherwise needs to be replaced.

In performing such battery tests, the predicted lifetime for each pitch battery 48, 50, 52 may be utilized to supplement the test results. Specifically, assuming that only a portion of the pitch batteries 48, 50, 52 fail the battery test (e.g., due to the blades 22 not being pitched at all or the pitch rate being too slow), the predicted lifetime(s) may be referenced to determine whether all of the pitch batteries 48, 50, 52 should be replaced or just the battery(ies) that failed the test. For example, if only one of the pitch batteries 48, 50, 52 fails the battery test but the predicted lifetime indicates that the pitch batteries 48, 50, 52 still have a substantial remaining lifetime (e.g., by having a predicted lifetime above the minimum lifetime threshold), it may only be desirable to replace the pitch battery 48, 50, 52 that failed the battery test. However, if only one of the pitch batteries 48, 50, 52 fails the test and the predicted lifetime indicates that the pitch batteries 48, 50, 52 do not have substantial remaining lifetime (e.g., by having a predicted lifetime that is less than the minimum lifetime threshold), it may desirable to proceed with replacing all of the pitch batteries 48, 50, 52 despite the fact that some of the batteries may have passed the test.

Additionally, the predicted lifetime may also be utilized as a basis for scheduling the battery tests. For example, while the predicted lifetime is relatively high, it may be desirable for battery tests to be performed on the pitch batteries 48, 50, 52 at a relatively low frequency. However, as the predicted lifetime decreases, it may be desirable to increase the frequency at which at the battery tests are performed. For example, when a pitch battery 48, 50, 52 is initially installed within a wind turbine 10, battery tests may be performed at an initial frequency (e.g., every 6 to 8 weeks), with this frequency being increased as function of decreases in the predicted lifetime of the batteries 48, 50, 52.

It should be appreciated that, as indicated above, the present subject matter is also directed to a system for predicting the remaining lifetime of wind turbine batteries. In one embodiment, the system may include a battery (e.g., pitch battery 48, 50, 52) configured to supply power to a component of the wind turbine 10 (e.g., the pitch adjustment mechanism 32). In addition, the system may include both a sensor (e.g., temperature sensor 58) configured to measure an air temperature of a location (e.g., the hub 20) at which the battery is stored within the wind turbine 10 and a controller (e.g., controller 26, 30) communicatively coupled to the sensor. The controller may be configured to determine a predicted lifetime for the battery based on the air temperature measurements provided by the sensor.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A method for scheduling the replacement of wind turbine batteries, the method comprising:
   monitoring an air temperature of a location at which a battery is stored within a wind turbine;
   determining with a controller a predicted lifetime for the battery based on the monitored air temperature; and
   determining when to replace the battery based at least in part on the predicted lifetime.

2. The method of claim 1, wherein the battery is stored within a hub of the wind turbine, wherein monitoring an air temperature of a location at which a battery is stored within a wind turbine comprises monitoring the air temperature within the hub.

3. The method of claim 2, wherein the battery comprises a pitch battery of the wind turbine.

4. The method of claim 1, wherein determining with a controller a predicted lifetime for the battery based on the monitored air temperature comprises modifying a baseline lifetime of the battery based on the monitored air temperature.

5. The method of claim 1, wherein determining a predicted lifetime for the battery based on the monitored air temperature comprises continuously updating the predicted lifetime for the battery over time based on the monitored air temperature.

6. The method of claim 1, further comprising comparing the predicted lifetime to a minimum lifetime threshold associated with the battery.

7. The method of claim 6, wherein the battery is initially scheduled to be replaced on a predetermined date, wherein determining when to replace the battery based at least in part on the predicted lifetime comprises scheduling a new replacement date for the battery when the predicted lifetime has fallen or will fall below the minimum lifetime threshold prior to the predetermined date.

8. The method of claim 6, wherein the battery is initially scheduled to be replaced on a predetermined date, wherein determining when to replace the battery based at least in part on the predicted lifetime comprises determining to replace the battery on the predetermined date when the predicted lifetime will not fall below the minimum lifetime threshold prior to the predetermined date.

9. The method of claim 5, wherein the minimum lifetime threshold ranges from about 5% to about 25% of a baseline lifetime of the battery.

10. The method of claim 1, further comprising performing a battery test on the battery.

11. The method of claim 10, wherein the wind turbine comprises at least one additional battery, wherein determining when to replace the battery based at least in part on the predicted lifetime comprises determining whether to replace both the battery and the at least one additional battery based on the predicted lifetime when the battery fails the battery test.

12. The method of claim 10, further comprising adjusting a frequency at which the battery test is performed on the battery based on the predicted lifetime.

13. A system for predicting the remaining lifetime of wind turbine batteries, the system comprising:
   a battery configured to supply power to a component of the wind turbine;
   a temperature sensor configured to measure an air temperature of a location at which the battery is stored within the wind turbine; and
   a controller communicatively coupled to the temperature sensor, the controller being configured to determine a predicted lifetime for the battery based on the air temperature measurements provided by the temperature sensor.

14. The system of claim 13, wherein the battery comprises a pitch battery configured to supply power to a pitch adjustment mechanism of the wind turbine, the temperature sensor being configured to measure the air temperature within a hub of the wind turbine.

15. The system of claim 13, wherein the controller is further configured to perform a battery test on the battery by pitching a rotor blade associated with the pitch adjustment mechanism across a range of pitch angles.

16. The system of claim 13, wherein the controller is configured to determine the predicted lifetime by modifying a baseline lifetime of the battery based on the air temperature measurements.

17. The system of claim 13, wherein the controller is configured to continuously update the predicted lifetime over time based on the air temperature measurements.

18. The system of claim 13, wherein the controller is further configured to compare the predicted lifetime to a minimum lifetime threshold associated with the battery.

19. The system of claim 18, wherein the minimum lifetime threshold ranges from about 5% to about 25% of a baseline lifetime of the battery.

20. A wind turbine comprising:

a tower;

a nacelle mounted on the tower;

a rotor coupled to the nacelle, the rotor including a hub and at least one rotor blade extending from the hub;

a pitch adjustment mechanism configured to pitch the at least one rotor blade;

a pitch battery configured to supply power to the pitch adjustment mechanism;

a temperature sensor configured to measure an air temperature within the hub; and a controller communicatively coupled to the temperature sensor, the controller being configured to determine a predicted lifetime for the pitch battery based on the air temperature measurements provided by the temperature sensor.

* * * * *